US012562532B2

(12) United States Patent
Lu et al.

(10) Patent No.: US 12,562,532 B2
(45) Date of Patent: Feb. 24, 2026

(54) CONNECTOR ASSEMBLY

(71) Applicant: Molex, LLC, Lisle, IL (US)

(72) Inventors: You-Qian Lu, New Taipei (TW); Che-Yuan Yang, New Taipei (TW)

(73) Assignee: Molex, LLC, Lisle, IL (US)

(*) Notice: Subject to any disclaimer, the term of this patent is extended or adjusted under 35 U.S.C. 154(b) by 224 days.

(21) Appl. No.: 17/984,270

(22) Filed: Nov. 10, 2022

(65) Prior Publication Data

US 2023/0170650 A1 Jun. 1, 2023

(30) Foreign Application Priority Data

Nov. 29, 2021 (CN) ........................ 202111430997.0

(51) Int. Cl.
*H01R 13/6582* (2011.01)
*H01R 13/11* (2006.01)
*H01R 13/629* (2006.01)
*H01R 13/639* (2006.01)

(52) U.S. Cl.
CPC ......... *H01R 13/6582* (2013.01); *H01R 13/11* (2013.01); *H01R 13/629* (2013.01); *H01R 13/639* (2013.01)

(58) Field of Classification Search
CPC .. H01R 13/6582; H01R 13/11; H01R 13/629; H01R 13/639
USPC ..................................................... 439/607.01
See application file for complete search history.

(56) References Cited

U.S. PATENT DOCUMENTS

| | | | | |
|---|---|---|---|---|
| 6,186,830 B1* | 2/2001 | Lin | H01R 13/6594 439/79 |
| 7,845,975 B2 | 12/2010 | Cheng et al. | |
| 2014/0335726 A1* | 11/2014 | Zhang | H01R 13/743 439/607.01 |
| 2015/0171574 A1* | 6/2015 | Little | H01R 13/6658 439/78 |

(Continued)

FOREIGN PATENT DOCUMENTS

| | | |
|---|---|---|
| CN | 2548312 Y | 4/2003 |
| CN | 100481643 C | 4/2009 |

(Continued)

*Primary Examiner* — Gary F Paumen

(57) ABSTRACT

A connector assembly includes a shielding cover, a socket connector, and a rear cover. The shielding cover includes a plug connection channel having a rear end opening, and a top wall, two side walls and a bottom wall. Each of the side walls has a stop block protruding towards the plug connection channel. The stop block has a three-dimensional protruding structure and has an upper stop edge and a rear stop edge. The bottom wall has an insertion plate located in a rear portion and extending backwards. The socket connector is arranged in a rear section of the plug connection channel of the shielding cover by means of insertion from the rear end opening. The socket connector includes a socket housing. The socket housing has a stop block accommodation recess formed on a side surface thereof, and an insertion slot integrally formed in a bottom portion thereof. The stop block accommodation recess is used to accommodate the stop blocks on the two side walls, and the insertion plate of the shielding cover is inserted into the slot backwards. The rear cover is connected to the rear end opening of the shielding cover.

20 Claims, 12 Drawing Sheets

(56) References Cited

U.S. PATENT DOCUMENTS

| | | | | |
|---|---|---|---|---|
| 2016/0079713 | A1* | 3/2016 | Yu | H01R 13/6582 439/607.27 |
| 2017/0346232 | A1* | 11/2017 | Zhao | H01R 12/7005 |
| 2019/0267760 | A1* | 8/2019 | Chen | H01R 24/60 |
| 2021/0218197 | A1* | 7/2021 | Lv | H01R 13/6582 |
| 2021/0359470 | A1 | 11/2021 | Dunwoody | |
| 2021/0367381 | A1* | 11/2021 | Lv | H01R 13/6582 |

FOREIGN PATENT DOCUMENTS

| | | | |
|---|---|---|---|
| CN | 202127131 | U | 1/2012 |
| CN | 104345414 | A | 2/2015 |
| CN | 107437681 | A | 12/2017 |
| CN | 211295586 | U | 8/2020 |
| CN | 211700636 | U | 10/2020 |
| EP | 0969562 | A1 | 1/2000 |
| JP | H1174026 | A | 3/1999 |
| TW | I367607 | B | 7/2012 |
| TW | 201232971 | A | 8/2012 |
| TW | M596469 | U | 6/2020 |

* cited by examiner

CONNECTOR ASSEMBLY

RELATED APPLICATIONS

This application claims priority to Chinese Patent Application Serial No. 202111430997.0, filed Nov. 29, 2021, which is incorporated herein by reference in its entirety.

TECHNICAL FIELD

The present invention relates to a connector, and relates in particular to a connector assembly.

BACKGROUND ART

The Chinese invention patent having Publication No. CN101669256B (corresponding to U.S. Pat. No. 7,845,975 B2) discloses a connector assembly, a plurality of alignment features being provided on a side wall of a cage member of the connector assembly, and a plurality of alignment slots being provided on a side wall of a connector housing of the connector assembly. The corresponding alignment features on the side wall of the cage member are aligned and matched with the slots on the side wall of the connector housing, so as to ensure correct alignment between the cage member and the connector housing. However, the alignment features disclosed in said patent are plates cut out on the side wall of the cage member, and the plates approximately vertically extend relative to the body of the side wall, and thus the alignment features having the plate structure have low strength and are susceptible to deformation.

SUMMARY

Accordingly, an objective of the present invention is to provide a connector assembly which can improve at least one disadvantage of the prior art.

In some embodiments, the connector assembly of the present invention comprises a shielding cover, a socket connector and a rear cover. The shielding cover comprises a plug connection channel having a rear end opening, and a top wall, two side walls and a bottom wall defining the plug connection channel. Each of the side walls is provided with an integrally formed stop block protruding towards the plug connection channel, the stop block has a three-dimensional protruding structure and has an upper stop edge and a rear stop edge, and the bottom wall has an insertion plate located in a rear portion and extending backwards. The socket connector is arranged in a rear section of the plug connection channel of the shielding cover by means of insertion from the rear end opening. The socket connector comprises a socket housing, the socket housing has stop block accommodation recesses integrally formed on side surfaces thereof, and an insertion slot integrally formed in a bottom portion thereof and having a front opening, the stop block accommodation recesses are used to accommodate the stop blocks on the two side walls, each of the stop block accommodation recesses has an upper recess inner edge and a rear recess inner edge, the upper recess inner edge is stopped by an upper stop edge of the corresponding stop block, the rear recess inner edge is stopped by a rear stop edge of the corresponding stop block, and the insertion plate of the shielding cover is inserted into the insertion slot backwards. The rear cover is connected to the rear end opening of the shielding cover.

In some embodiments, the bottom wall of the shielding cover is provided with integrally formed support plates extending backwards, the support plates are located on two sides of the insertion plate and extend beyond a distal end of the insertion plate, and the support plates are used to support the bottom portion of the socket housing.

In some embodiments, the insertion plate is located higher than the support plates.

In some embodiments, a front edge and a lower edge of the stop block of each of the side walls are integrally connected to a body of the side wall, an upper edge and a rear edge of the stop block are cut out from the body of the side wall and are inwardly separated from the body of the side wall, so as to respectively constitute the upper stop edge and the rear stop edge.

In some embodiments, the rear cover has an integrally formed pressure application elastic plate for applying forward pressure on the rear end of the socket housing.

In some embodiments, each of the side walls is further provided with a retainer stop integrally formed behind the stop block, and the retainer stop engages with the rear end of the socket housing, so as to prevent the socket connector from moving backwards.

In some embodiments, a rear edge of the retainer stop is integrally connected to the body of the corresponding side wall, and the retainer stop extends forwards and extends inwardly and obliquely, and a front edge of the retainer stop abuts the rear end of the socket housing.

In some embodiments, the shielding cover comprises an upper housing and a lower housing connected to each other and forming the plug connection channel, the upper housing has the top wall and the two side walls integrally connected to each other and defining the plug connection channel, and the lower housing has the bottom wall defining the plug connection channel.

In some embodiments, the shielding cover comprises two of the plug connection channels which are vertically arranged, the shielding cover comprises an upper housing, a lower housing and a partition frame connected to each other and forming the two plug connection channels, the upper housing has the top wall and the two side walls integrally connected to each other, the lower housing has the bottom wall, and the two plug connection channels are defined by the top wall, the two side walls and the bottom wall and are separated by the partition frame.

The stop block in the present invention has a three-dimensional protruding structure, and thus has a higher strength and is not susceptible to deformation, and can be used to guide insertion of the socket connector into the shielding cover during an assembly process. In addition, the upper stop edge of the stop block can prevent the socket connector from moving downwards relative to the shielding cover, and the rear stop edge of the stop block can prevent the socket connector from moving forward relative to the shielding cover. Secondly, since the insertion plate on the bottom wall of the shielding cover is correspondingly inserted into the insertion slot in the bottom portion of the socket housing, and since the support plates on the bottom wall of the shielding cover support the bottom portion of the socket housing, the assembly strength between the socket connector and the shielding cover can be reinforced. Further, the pressure application elastic plate of the rear cover is used to apply forward pressure on the rear end of the socket housing, so that the socket connector can be prevented from moving backwards and an assembly position of the socket connector can be fixed. In addition, the retainer stop on each of the side walls of the shielding cover engages with the rear end of the socket housing, so that the socket connector can be further prevented from moving backwards. In summary, the assembly strength and assembly integrity between the socket connector and the shielding cover can be increased, improving tolerance to external forces and the precision of an assembly position.

BRIEF DESCRIPTION OF THE DRAWINGS

The other features and effects of the present invention will become apparent in the following embodiments with reference to the drawings.

DETAILED DESCRIPTION OF THE PREFERRED EMBODIMENTS

Before the invention is described in detail, it should be noted that in the following description, similar elements are represented by using the same number.

Figure 1:
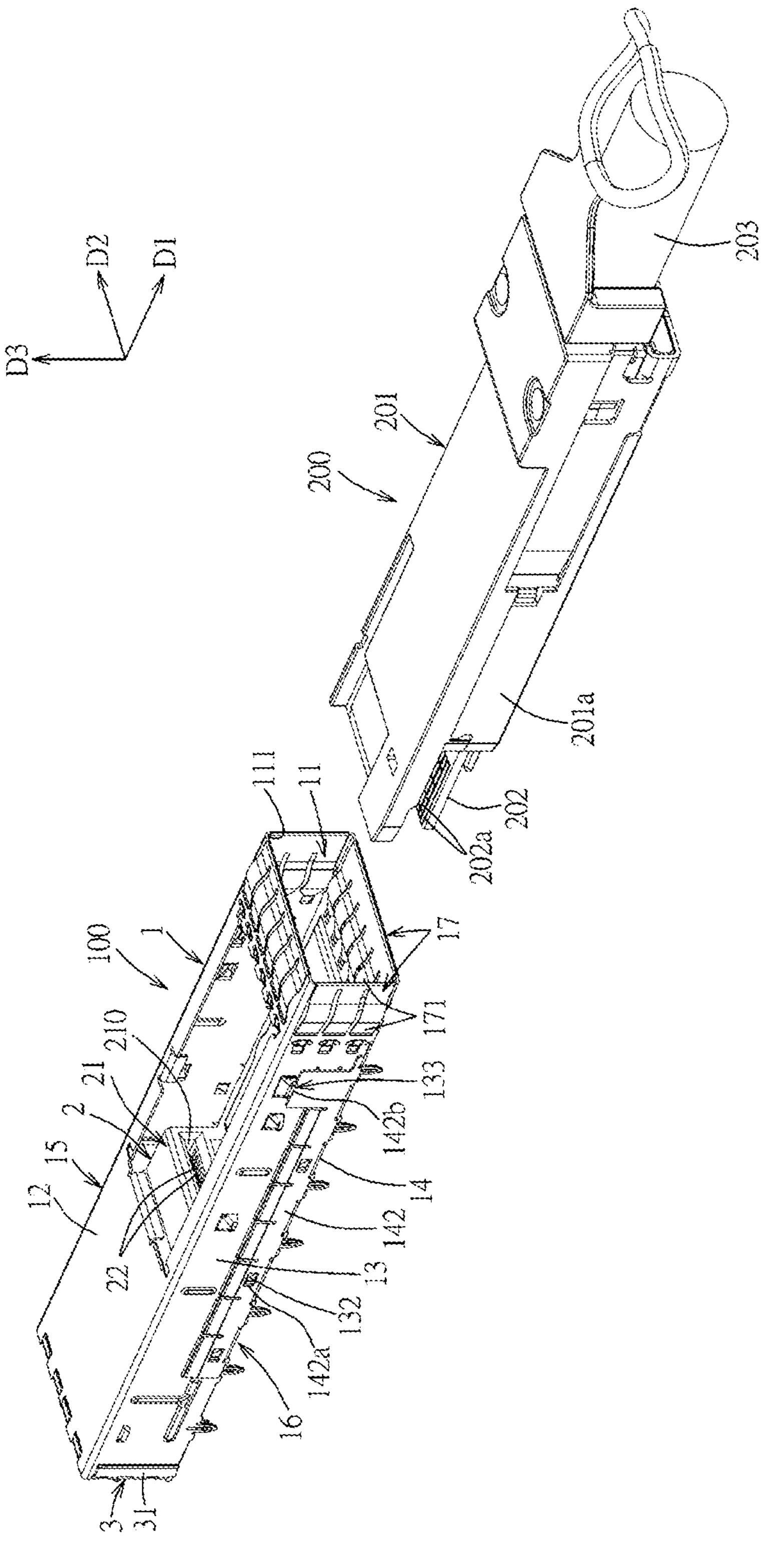
FIG. 1 is a perspective view showing a first embodiment of the connector assembly of the present invention and a pluggable module.
Figure 2:
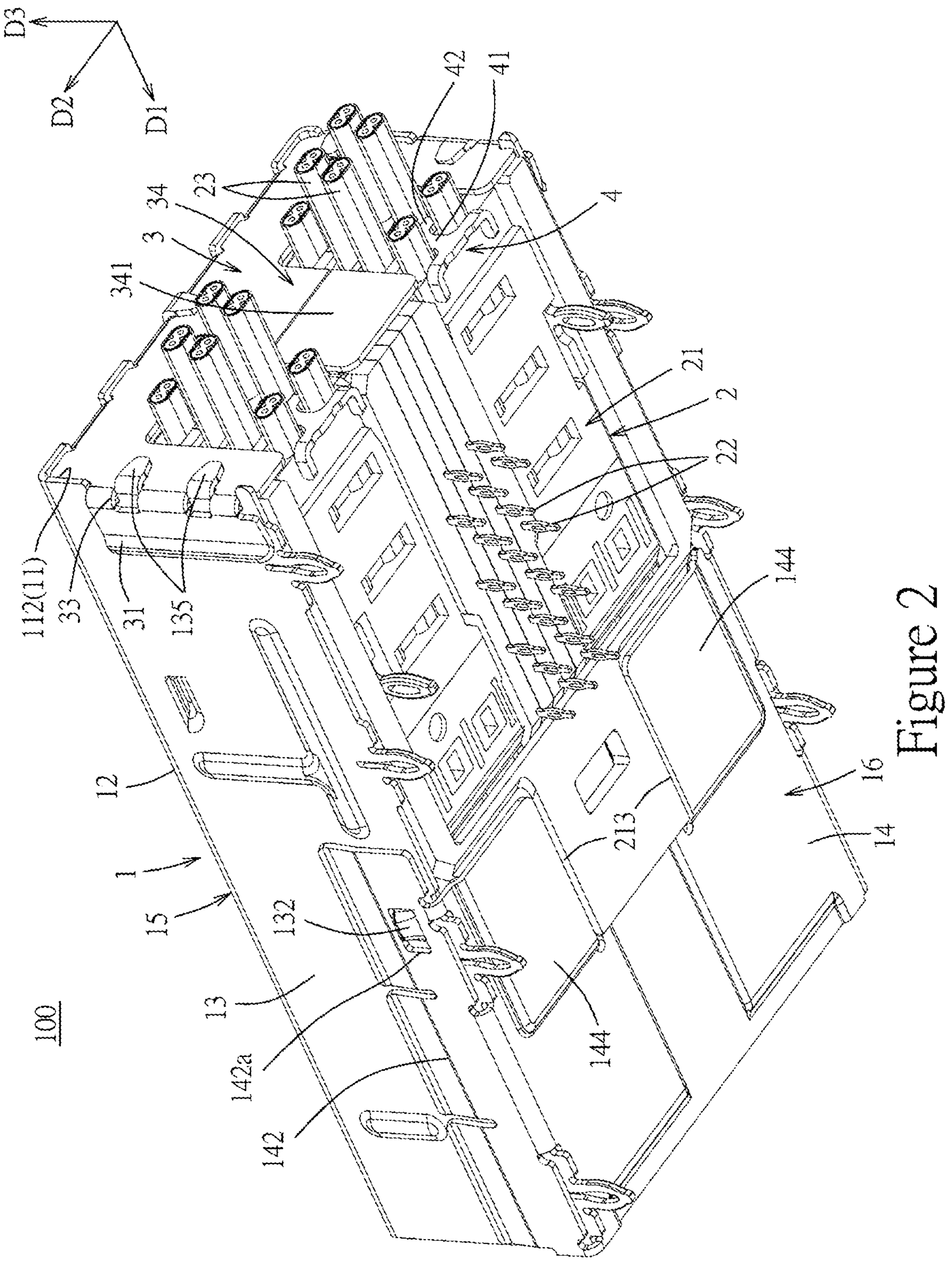
FIG. 2 is a partial perspective view of the first embodiment.
Figure 3:
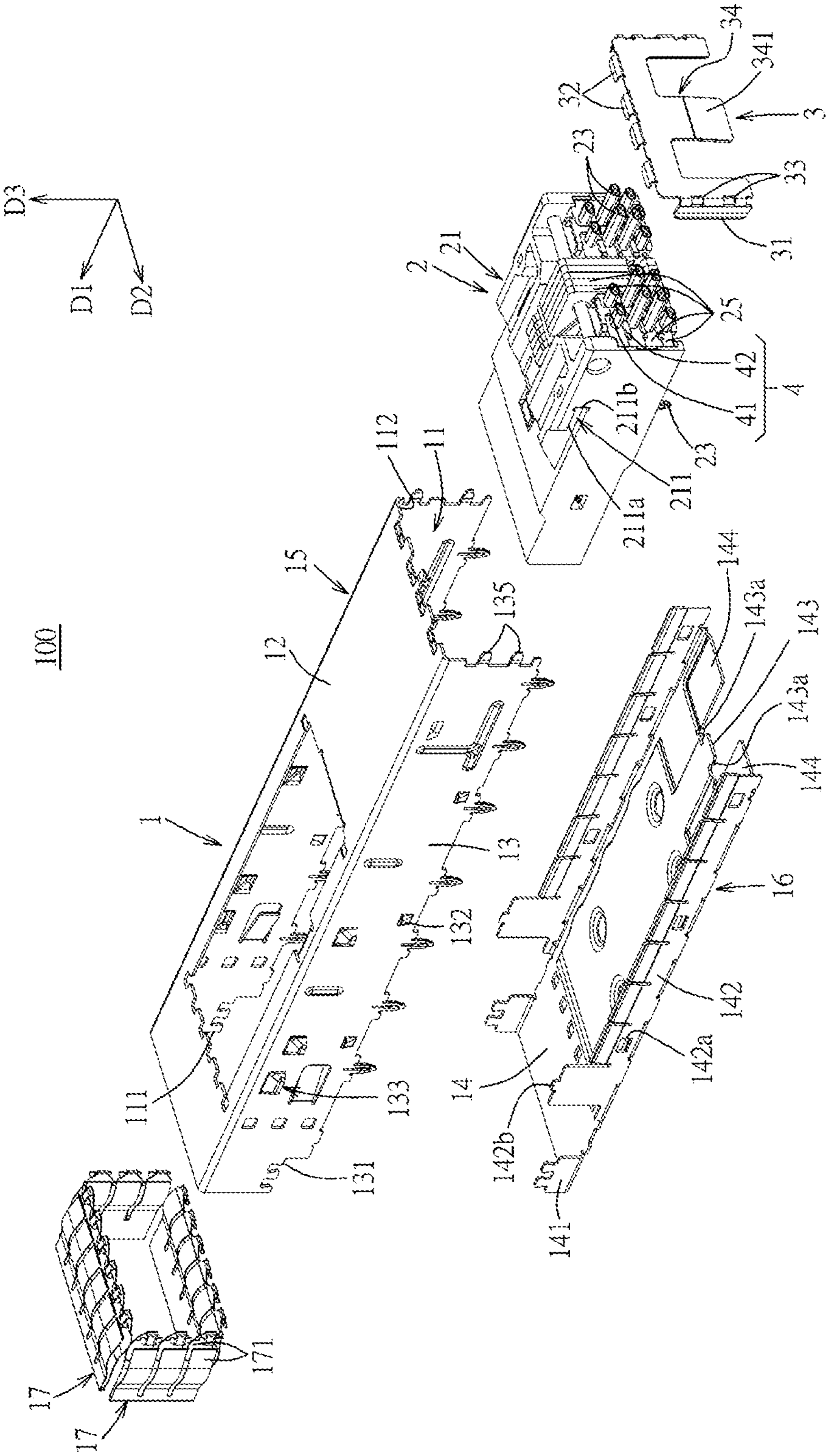
FIG. 3 is an exploded perspective view of the first embodiment.
Figure 4:
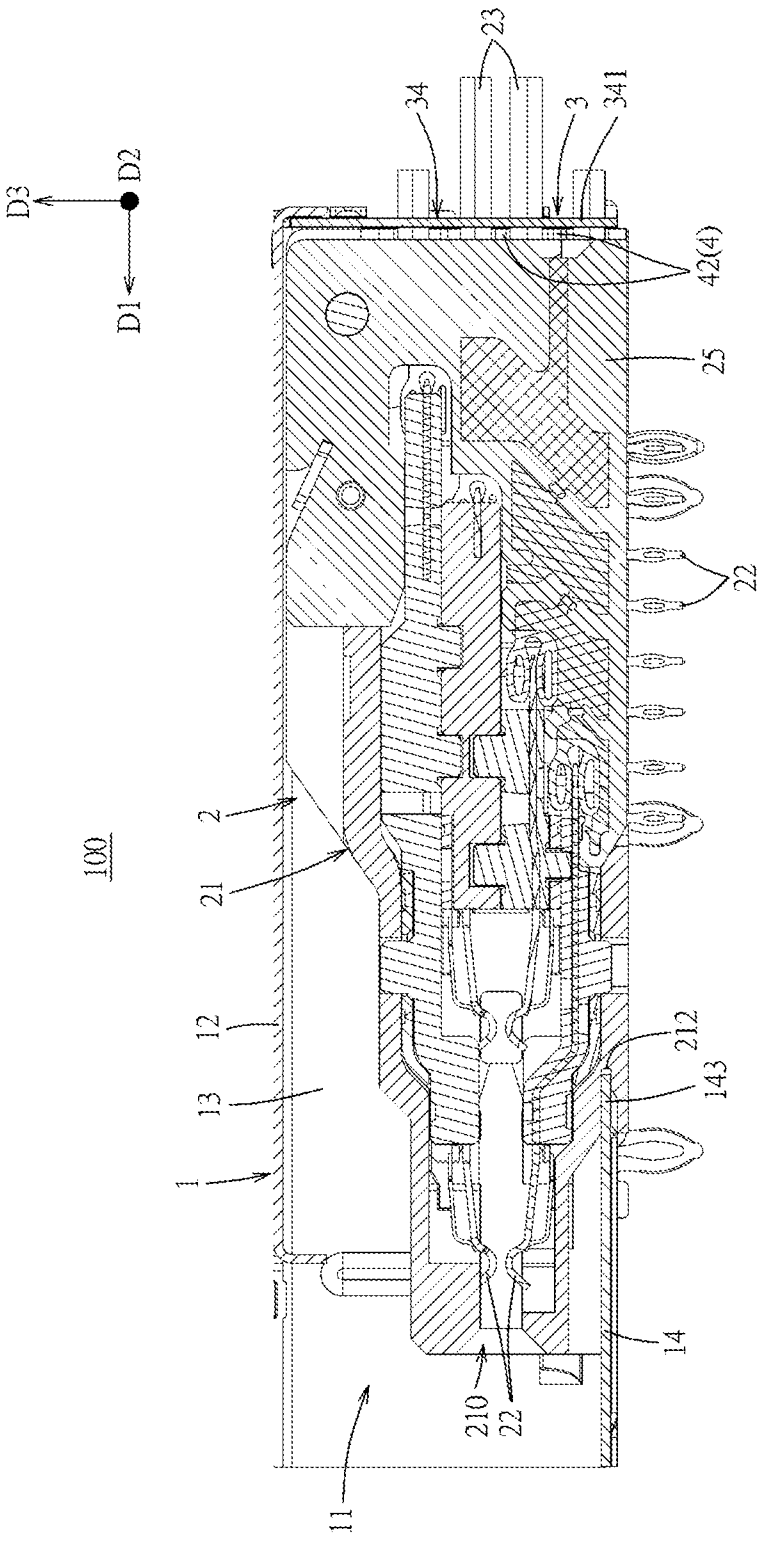
FIG. 4 is a partial cross-sectional view of FIG. 2.
Figure 5:
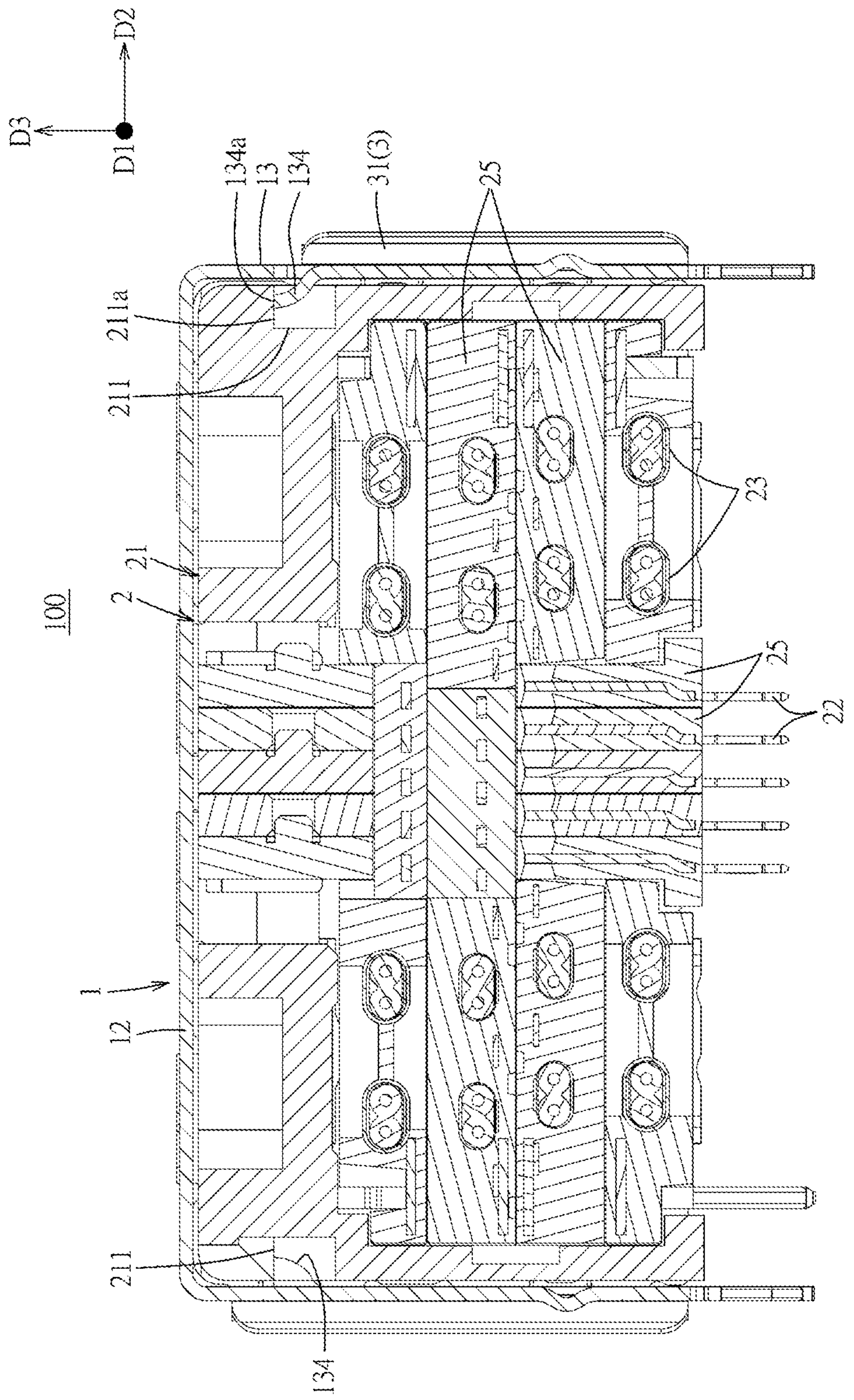
FIG. 5 is another partial cross-sectional view of FIG. 2 illustrating a stop block of a shielding cover of the first embodiment.
Figure 6:
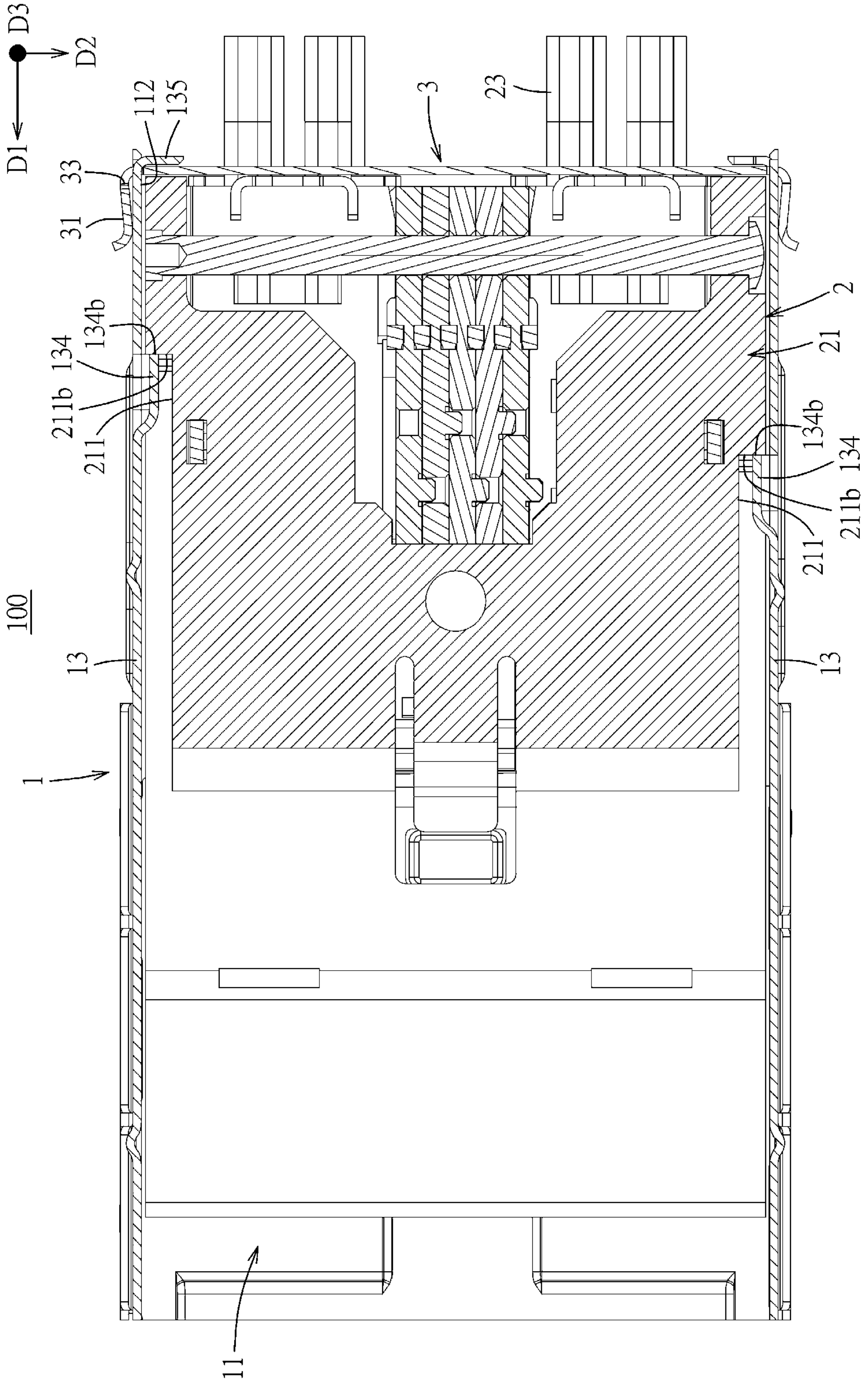
FIG. 6 is yet another partial cross-sectional view of FIG. 2 illustrating the stop block of the shielding cover of the first embodiment.
Figure 7:
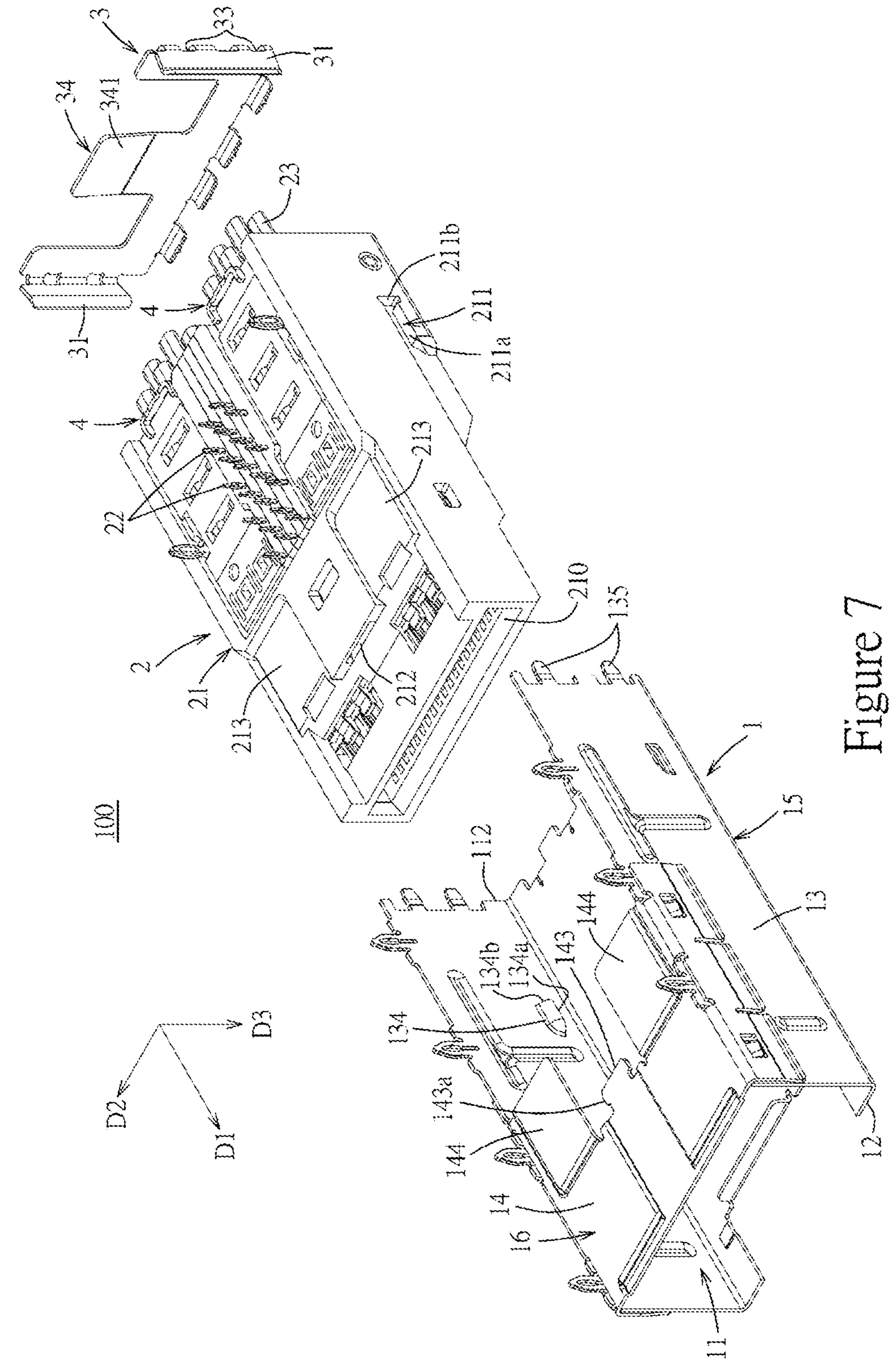
FIG. 7 is a partial exploded perspective view of the first embodiment.
Figure 8:
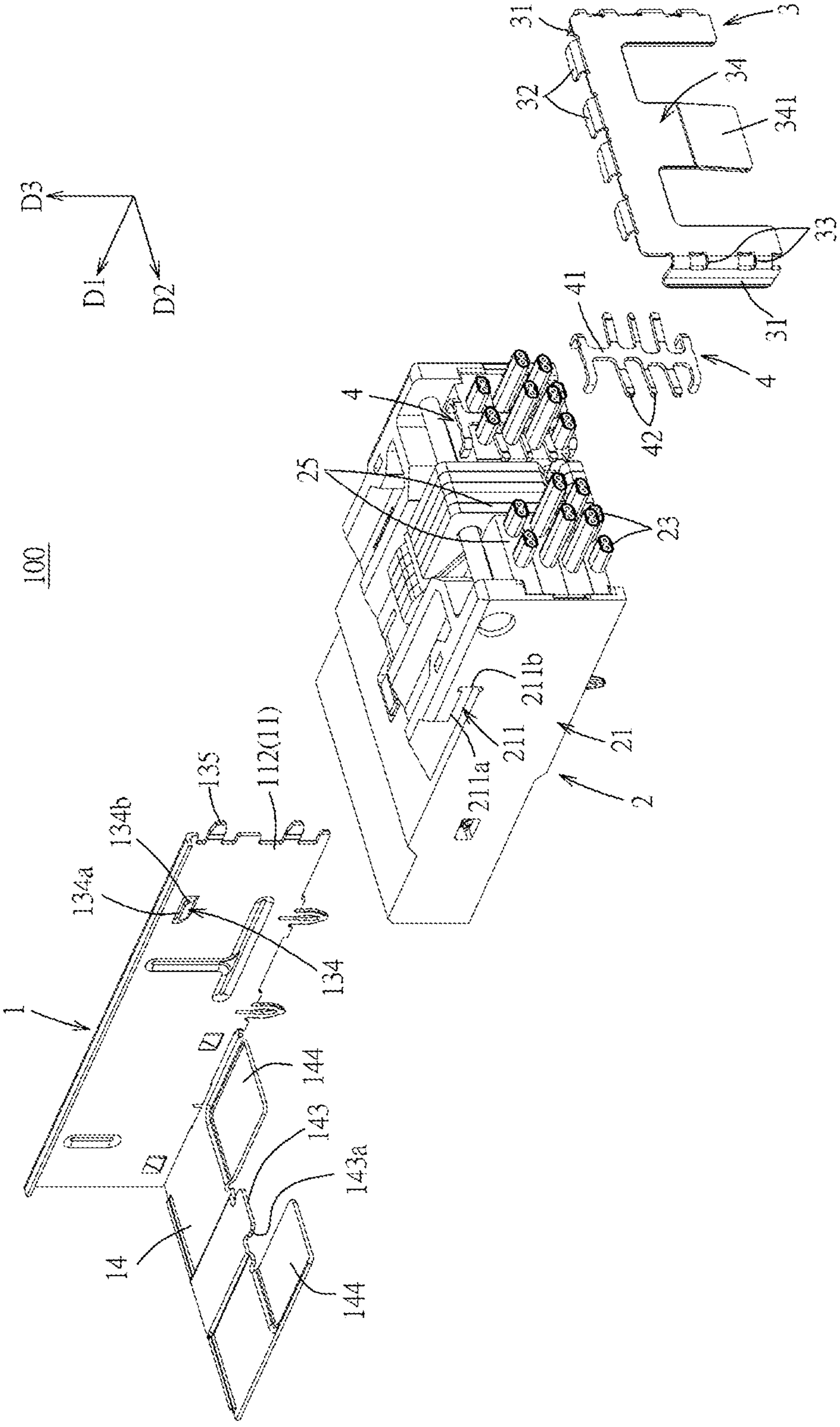
FIG. 8 is another partial exploded perspective view of the first embodiment.
Figure 9:
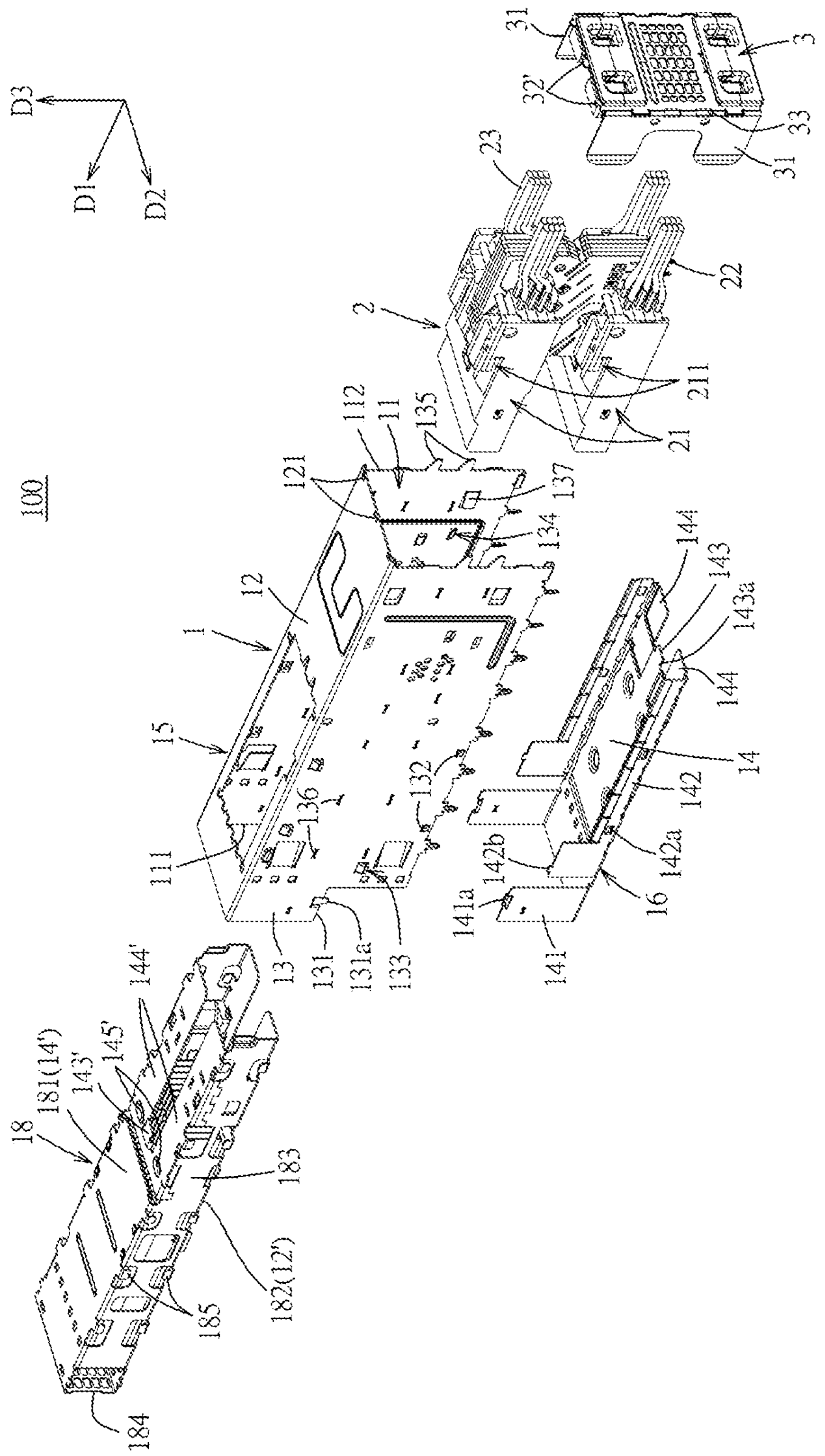
FIG. 9 is an exploded perspective view showing a second embodiment of the connector assembly of the present invention.
Figure 10:
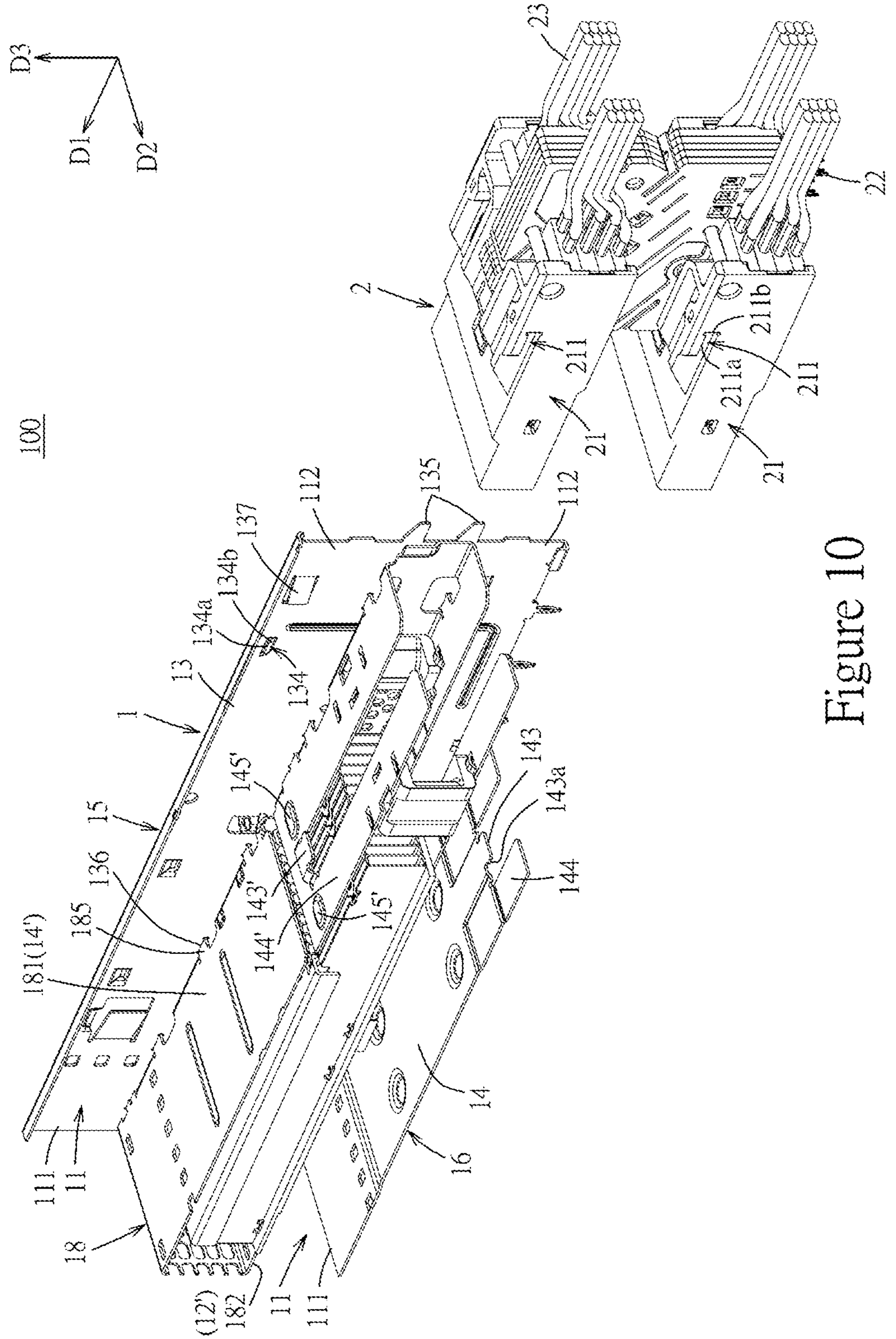
FIG. 10 is an exploded perspective view of the second embodiment, in which a rear cover of the second embodiment is omitted, and the shielding cover of the second embodiment is only partially shown.
Figure 11:
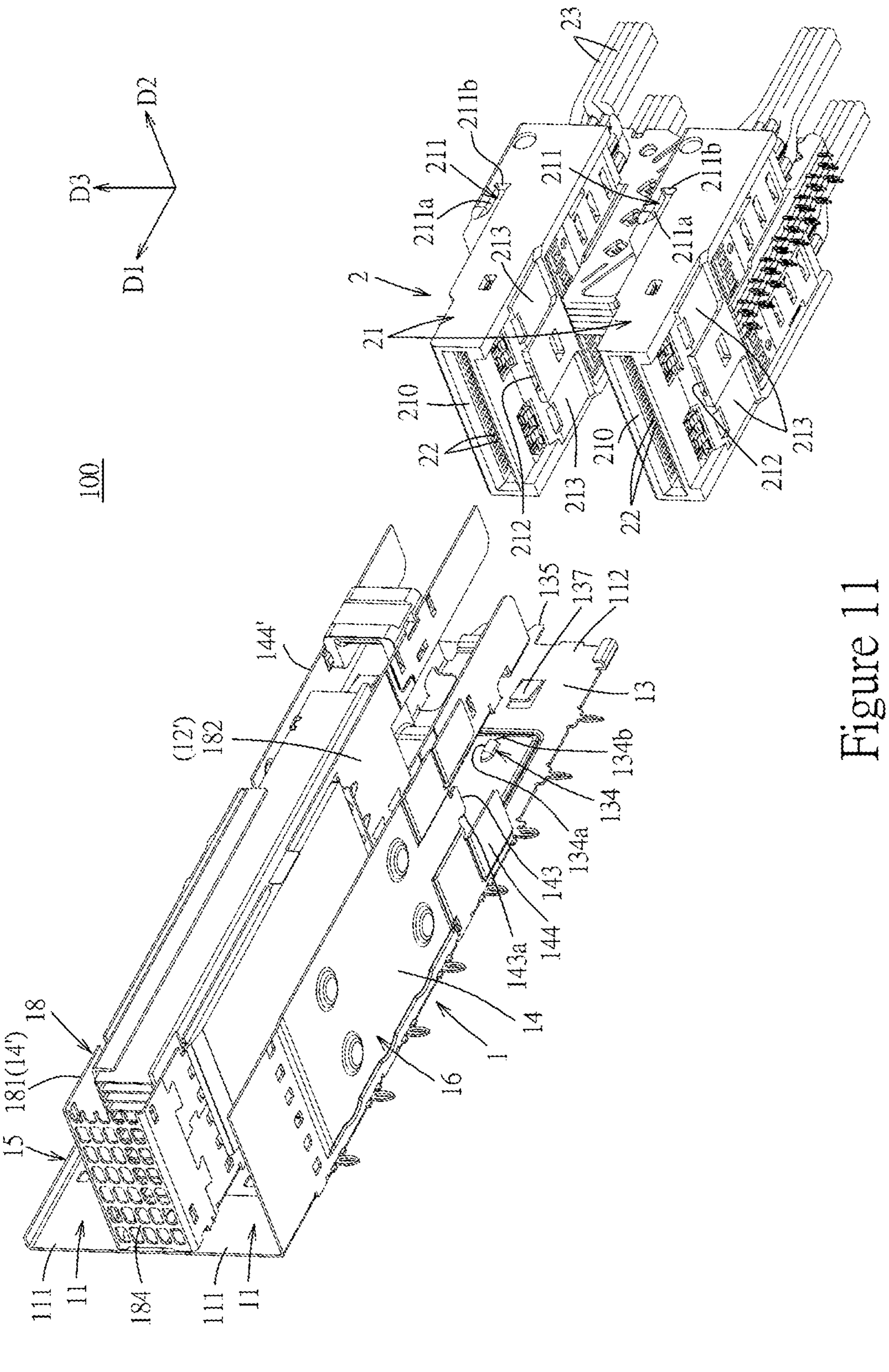
FIG. 11 is an exploded perspective view of the second embodiment in FIG. 10, viewed from another perspective.
Figure 12:
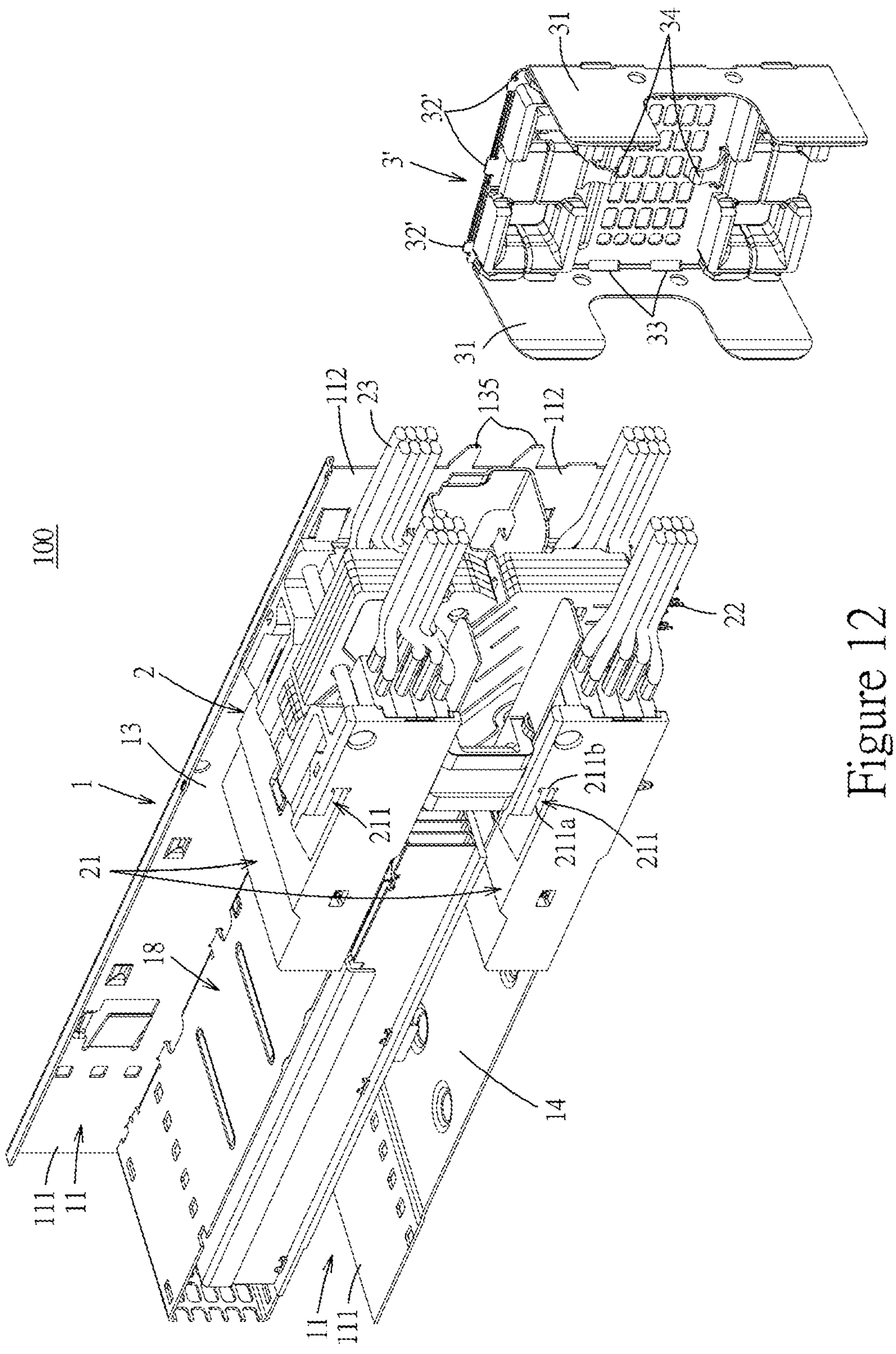
FIG. 12 is an exploded perspective view of the second embodiment, in which the shielding cover of the second embodiment is only partially shown.

FIG. 1 to FIG. 3 show a first embodiment of a connector assembly 100 of the present invention, the connector assembly being configured such that a pluggable module 200 can be plugged into and connected to the connector assembly. The pluggable module 200 includes a housing 201, a plug connection plate 202 and a cable 203. The housing 201 includes a plug connection portion 201*a*. The plug connection plate 202 is provided at a distal end of the plug connection portion 201*a*, and the plug connection plate 202 has a plurality of contact finger portions 202*a*. The cable 203 is provided in the housing 201 and mechanically and electrically connected to the plug connection plate 202. The connector assembly 100 includes a shielding cover 1, a socket connector 2 and a rear cover 3.

The shielding cover 1, for instance, is formed by means of processing techniques such as stamping and bending a conductive metal plate, and is used to guide the pluggable module 200 and provide shielding against electromagnetic interference. The shielding cover 1 extends in a front-rear direction D1 (the direction pointed by the arrow is the front, and the opposite is the rear), and includes a plug connection channel 11, a top wall 12, two side walls 13 spaced apart from and opposite to each other in a left-right direction D2 (the direction pointed by the arrow is the right, and the opposite is the left) and connected to two sides of the top wall 12, and a bottom wall 14 spaced apart from and opposite to the top wall 12 in an up-down direction D3 (the direction pointed by the arrow is up, and the opposite is down) and connected to bottom edges of the two side walls 13. In addition, the plug connection channel 11 is collectively defined by the top wall 12, the two side walls 13 and the bottom wall 14. The plug connection channel 11 has a front end jack 111 located at a front end thereof and enabling the pluggable module 200 to be plugged therein, and a rear end opening 112 located at a rear end thereof.

In the present first embodiment, the shielding cover 1 includes an upper housing 15 and a lower housing 16 connected to each other and forming the plug connection channel 11. The upper housing 15 has the top wall 12 and the two side walls 13 integrally connected to each other and defining the plug connection channel 11. The lower housing 16 has the bottom wall 14 defining the plug connection channel 11. The lower housing 16 of the shielding cover 1 is provided at the two side walls 13 of the upper housing 15 to form an assembly. A recessed portion 131 is formed at a bottom edge of a near-front end of each of the side walls 13 of the upper housing 15, and each of the side walls 13 is externally formed with a plurality of engagement blocks 132, and an insertion hole 133 having a downward-facing opening. Two protrusion portions 141 correspondingly matching the recessed portions 131 of the two side walls 13, and two side plates 142 correspondingly connected at outer sides of the two side walls 13 are integrally and upwardly formed at the bottom wall 14 of the lower housing 16. The recessed portions 131 and the protrusion portions 141 are mutually cooperated dovetail structures. Each of the side plates 142 is formed with a plurality of engagement holes 142*a* matching the engagement blocks 132 of the corresponding side wall 13, and an insertion portion 142*b* upwardly inserted into the insertion hole 133 of the corresponding side wall 13, thereby enabling the bottom wall 14 of the lower housing 16 to be connected to the two side walls 13 of the upper housing 15.

Referring to FIG. 1 to FIG. 5, the socket connector 2 is arranged in a rear section of the plug connection channel 11 of the shielding cover 1 by means of insertion from the rear end opening 112, and the socket connector 2 includes a socket housing 21, a plurality of terminals 22 and a plurality of cables 23. The socket housing 21 has a front-facing plug connection slot 210, and the terminals 22 are provided in the socket housing 21 and extend into the plug connection slot 210. In the present first embodiment, the socket connector 2 further includes a plurality of terminal fixing blocks 25 partially wrapped around the terminals 22 and provided in the socket housing 21. Tail portions of the terminals 22 at terminal fixing blocks 25 located in the middle and vertically formed extend from a bottom portion of the socket housing 21. Tail portions of the terminals 22 at terminal fixing blocks 25 located on left and right sides and horizontally formed are respectively connected to the cables 23, and the cables 23 extend from a rear end of the socket housing 21.

Referring to FIG. 3 to FIG. 7, each of the side walls 13 has an integrally formed stop block 134 protruding towards the plug connection channel 11. The stop block 134 has a three-dimensional protruding structure and has an upper stop edge 134*a* and a rear stop edge 134*b*. In further detail, the stop block 134 of each of the side walls 13 has a front edge and a lower edge integrally connected to a body of the side wall 13, and an upper edge and a rear edge of the stop block 134 are cut out from the body of the side wall 13 and are inwardly separated from the body of the side wall 13, so as to respectively constitute the upper stop edge 134*a* and the rear stop edge 134*b*. The bottom wall 14 has an insertion plate 143 which is located in a rear portion thereof and extends backwards, and two support plates 144 which are integrally formed and extend backwards, the two support plates 144 are located on two sides of the insertion plate 143 and extend beyond a distal end of the insertion plate 143. In further detail, the insertion plate 143 is located higher than the support plates 144.

The socket housing 21 has two stop block accommodation recesses 211 which are integrally formed on side surfaces thereof, and an insertion slot 212 which is integrally formed in a bottom portion thereof and has a front opening. The stop block accommodation recesses 211 are used to accommodate the stop blocks 134 of the two side walls 13. Each of the stop block accommodation recesses 211 has an upper recess inner edge 211*a* and a rear recess inner edge 211*b*, the upper recess inner edge 211*a* is stopped by the upper stop edge 134*a* of the corresponding stop block 134, and the rear recess inner edge 211*b* is stopped by the rear stop edge 134*b* of the corresponding stop block 134. The insertion plate 143 of the shielding cover 1 is inserted into the insertion slot 212 backwards, and the support plates 144 are used to support the bottom portion of the socket housing 21. Further, in the present first embodiment, the insertion plate 143 has an interference bump 143*a* which interferes with and fixes the insertion slot 212, and the bottom portion of the socket housing 21 has two integrally formed accommodation recessed portions 213 for accommodating the two support plates 144.

Referring to FIG. 1 and FIG. 3 to FIG. 6, since the stop block 134 has a three-dimensional protruding structure, the overall structure has a higher strength and is not susceptible to deformation, and can be used to guide insertion of the socket connector 2 into the shielding cover 1 during an assembly process. In addition, the upper stop edge 134*a* of the stop block 134 can prevent the socket connector 2 from moving downwards relative to the shielding cover 1, and the rear stop edge 134*b* of the stop block 134 can prevent the socket connector 2 from moving forward relative to the shielding cover 1. Secondly, since the insertion plate 143 on the bottom wall 14 of the shielding cover 1 is correspondingly inserted into the insertion slot 212 in the bottom portion of the socket housing 21, and since the support plates 144 on the bottom wall 14 of the shielding cover 1 support the bottom portion of the socket housing 21, the assembly strength between the socket connector 2 and the shielding cover 1 can be reinforced.

Referring to FIG. 1 to FIG. 4 and FIG. 8, the rear cover 3 is connected to the rear end opening 112 of the shielding cover 1, and each of the side walls 13 of the shielding cover 1 has a plurality of engagement members 135 which extend backwards from a rear end edge. The rear cover 3 has two side engagement plates 31 which extend forwards from the left and right sides to be engaged with the two side walls 13 of the shielding cover 1, a plurality of upper engagement plates 32 which extend forwards from an upper edge to be engaged with the top wall 12 of the shielding cover 1, and a plurality of engagement holes 33 formed at a connection location between the two side engagement plates 31 and a body of the rear cover 3. The engagement members 135 of the shielding cover 1 pass through the engagement holes 33 and are then bent inwardly. In further detail, in the present first embodiment, the two side engagement plates 31 of the rear cover 3 extend forwards and extend inwardly and obliquely and have distal ends thereof outwardly turned. The two side engagement plates 31 have a positive force and inwardly press and abut the two side walls 13 of the shielding cover 1. In addition, the cables 23 of the socket connector 2 pass through and extend backwards out of the rear cover 3.

The rear cover 3 has an integrally formed pressure application elastic plate 34 for applying forward pressure on the rear end of the socket housing 21. As previously described, the rear stop edge 134*b* of the stop block 134 correspondingly engages with the rear recess inner edge 211*b* of the stop block accommodation recess 211 to prevent the socket connector 2 from moving forward, whereas the pressure application elastic plate 34 can prevent the socket connector 2 from moving backwards. Therefore, the pressure application elastic plate 34 can apply a forward combination force so as to fix an assembly position of the socket connector 2 relative to the shielding cover 1. In addition, in the present first embodiment, the pressure application elastic plate 34 has an elastic plate member 341 which is facing downwards and extends forwards and obliquely. The pressure application elastic plate 34 of the rear cover 3 is used to apply forward pressure on the rear end of the socket housing 21, so that the socket connector 2 can be prevented from moving backwards and an assembly position of the socket connector 2 can be fixed. In summary, structures such as the stop blocks 134, the stop block accommodation recesses 211, the insertion plate 143, the insertion slot 212, the support plates 144 and the pressure application elastic plate 34 can be used to increase the assembly strength and assembly integrity between the socket connector 2 and the shielding cover 1, which improves tolerance to external forces and precision of an assembly position.

In addition, in the present first embodiment, the connector assembly 100 further includes two metal shielding members 4 which have a branch-like structure and are held between the socket housing 21 and the rear cover 3. Each of the metal shielding members 4 has a vertically extending trunk portion 41 and a plurality of elastic support arms 42 extending from left and right sides of the trunk portion 41. The metal shielding members 4 are provided at the rear end of the socket housing 21. The trunk portion 41 and the elastic support arms 42 are respectively located between the cables 23, so as to provide electromagnetic shielding for the cables 23. The elastic support arms 42 are tilted backwards at a small angle in an unpressured state, so as to be firmly pressed backwards on the rear cover 3 which is also made of a metal material, thereby achieving grounding by means of mutual electrical connection.

Referring to FIG. 1 and FIG. 3, after the pluggable module 200 enters the plug connection channel 11 of the shielding cover 1 from the front end jack 111, the plug connection plate 202 at the distal end of the plug connection portion 201*a* of the pluggable module 200 can be inserted into the plug connection slot 210 of the socket connector 2, so that the contact finger portions 202*a* of the plug connection plate 202 can be in contact with the terminals 22 in the plug connection slot 210 of the socket connector 2, thereby enabling the pluggable module 200 and the socket connector 2 of the connector assembly 100 to be connected to each other. In addition, an installation hole for a chassis (not shown in the figures) can be provided adjacent to the front end jack 111 at a front section of the shielding cover 1. The shielding cover 1 further includes a plurality of grounding members 17 provided at the front end jack 111. The grounding members 17 have a plurality of elastic finger portions 171 which extend backwards from the front end jack 111 and arranged on the outer side and the inner side. The elastic finger portions 171 located on the outer side are in contact with a portion of the chassis around the periphery of the installation hole for the chassis, and the elastic finger portions 171 located on the inner side are in contact with the housing 201 of the pluggable module 200.

Referring to FIG. 9 to FIG. 12, a second embodiment of the connector assembly 100 of the present invention differs from the first embodiment in that: the shielding cover 1 includes two of the plug connection channels 11 which are arranged vertically, and the shielding cover 1 includes the upper housing 15, the lower housing 16 and a partition frame 18 connected to each other and forming the two plug connection channels 11. The partition frame 18 has an upper plate 181 and a lower plate 182 which are spaced apart from and opposite to each other in the up-down direction, two side connection plates 183 connected between the upper plate 181 and the lower plate 182 and spaced apart from and opposite to each other in the left-right direction, a front connection plate 184 connected between the upper plate 181 and the lower plate 182 and located at the front end, and a plurality of fold tabs for fixing 185 which are formed on side edges of the upper plate 181 and the lower plate 182. Each of the side walls 13 of the shielding cover 1 further has a plurality of perforations for fixing 136 correspondingly matching the fold tabs for fixing 185. The fold tabs for fixing 185 pass through the perforations for fixing 136 and are then bent, so as to enable the partition frame 18 to be connected to the two side walls 13 of the shielding cover 1.

The upper housing 15 has the top wall 12 and the two side walls 13 integrally connected to each other, and the lower housing 16 has the bottom wall 14. The upper plate 181 of the partition frame 18 constitutes a bottom wall 14' for defining the plug connection channel 11 above, and the lower plate 182 of the partition frame 18 constitutes a top wall 12' for defining the plug connection channel 11 below. In further detail, the plug connection channel 11 above is collectively defined by the top wall 12 and the two side walls 13 of the upper housing 15 and the upper plate 181 (the bottom wall 14') of the partition frame 18, and the plug connection channel 11 below is collectively defined by the two side walls 13 of the upper housing 15, the bottom wall 14 of the lower housing 16, and the lower plate 182 (the top wall 12') of the partition frame 18. The upper plate 181 (the bottom wall 14') of the partition frame 18 constitutes an insertion plate 143' and two support plates 144' on the left and the right. The insertion plate 143' is connected between the two support plates 144' and protrudes upwardly. The length in which the two support plates 144' extend backwards is greater than the length of the support plates 144 on the bottom wall 14, so as to support the bottom surface of the socket housing 21 above. Each of the two support plates 144' has a protrusion portion 145' formed thereon for supporting the accommodation recessed portion 213 on the bottom surface of the socket housing 21 above.

In addition, in the present second embodiment, the recessed portion 131 formed at the bottom edge of a near-front end of each of the side walls 13 of the upper housing 15 is provided with a front insertion portion 131*a*. Each of the two protrusion portions 141 integrally and upwardly formed on the bottom wall 14 of the lower housing 16 is provided with a front insertion hole 141*a* correspondingly matching the front insertion portion 131*a*. The front insertion portion 131*a* is inserted into the front insertion hole 141*a*, so as to reinforce the assembly strength between the upper housing 15 and the lower housing 16.

In addition, in the present second embodiment, the socket connector 2 has two of the socket housings 21 which are arranged vertically and respectively connected to the two plug connection channels 11. Each of the side walls 13 further has a retainer stop 137 integrally formed behind the stop block 134, and the retainer stops 137 respectively engage with the rear ends of the two socket housings 21, so as to prevent the socket connector 2 from moving backwards. In further detail, the rear edge of each retainer stop 137 is integrally connected to the body of the corresponding side wall 13, the other three edges thereof are cut out from the side wall 13 and deviated inwardly, so as to enable the retainer stop 137 to extend forwards and extend inwardly and obliquely. In addition, the front edge of the retainer stop 137 directly abuts the rear end of the socket housing 21. The retainer stop 137 on each of the side walls 13 of the shielding cover 1 engages with the rear end of the socket housing 21, so that the socket connector 2 can be further prevented from moving backwards. In this way, the assembly strength and assembly integrity between the socket connector 2 and the shielding cover 1 can be further increased.

The rear cover 3 has two of the pressure application elastic plates 34 respectively applying forward pressure on the rear ends of the two socket housings 21. For instance, the pressure application elastic plates 34 are elastic plate structures which are cut out from the body of the rear cover 3 and are inwardly bent. In addition, the rear cover 3 has a plurality of upper engagement plates 32' which are inserted into a plurality of perforations 121 at the rear end of the top wall 12 of the upper housing 15 of the shielding cover 1. By using the upper engagement plates 32, the combination strength between the rear cover 3 and the upper housing 15 of the shielding cover 1 can be reinforced.

In summary, the stop block 134 in the present invention has a three-dimensional protruding structure, and thus has a higher strength and is not susceptible to deformation, and can be used to guide insertion of the socket connector 2 into the shielding cover 1 during an assembly process. In addition, the upper stop edge 134*a* of the stop block 134 can prevent the socket connector 2 from moving downwards relative to the shielding cover 1, and the rear stop edge 134*b* of the stop block 134 can prevent the socket connector 2 from moving forward relative to the shielding cover 1. Secondly, since the insertion plate 143 on the bottom wall 14 of the shielding cover 1 is correspondingly inserted into the insertion slot 212 in the bottom portion of the socket housing 21, and since the support plates 144 on the bottom wall 14 of the shielding cover 1 support the bottom portion of the socket housing 21, the assembly strength between the socket connector 2 and the shielding cover 1 can be reinforced. Further, the pressure application elastic plates 34 of the rear cover 3 are used to apply forward pressure on the rear ends of the socket housings 21, so that the socket connector 2 can be prevented from moving backwards and an assembly position of the socket connector 2 can be fixed. In addition, the retainer stop 137 on each of the side walls 13 of the shielding cover 1 engages with the rear end of the socket housing 21, so that the socket connector 2 can be further prevented from moving backwards. In summary, the assembly strength and assembly integrity between the socket connector 2 and the shielding cover 1 can be increased, improving tolerance to external forces and the precision of the assembly position.

However, it is to be understood that the above descriptions are merely preferred embodiments of the present invention and are not to be used to limit the patent scope of the present invention, and that a wide variety of modifications thereto could be effected by persons skilled in the art without departing from the spirit and scope of the invention as set forth in the following claims.

The invention claimed is:

1. A connector assembly, comprising:

a shielding cover comprising a top wall, two side walls, and a bottom wall defining a plug connection channel, a side wall among the two side walls comprising a stop block protruding towards the plug connection channel, the stop block comprising an upper stop edge and a rear stop edge, the rear stop edge arranged in a rear section of the plug connection channel and facing rearwardly toward a rear end opening of the plug connection channel; and a socket connector comprising a socket housing and arranged in the rear section, the socket housing comprising a stop block accommodation recess on a side surface of the socket housing, the stop block accommodation recess comprising an upper recess inner edge and a rear recess inner edge, the upper recess inner edge of the socket connector being stopped by the upper stop edge of the shielding cover, the rear recess inner edge of the socket connector being stopped by the rear stop edge of the shielding cover.

2. The connector assembly according to claim 1, wherein:

a second side wall among the two side walls comprises a second stop block protruding towards the plug connection channel; and the socket housing comprises a second stop block accommodation recess on a second side surface of the socket housing.

3. The connector assembly according to claim 1, wherein:

the socket housing further comprises an insertion slot formed in a bottom portion;

the bottom wall of the shielding cover comprises an insertion plate; and the insertion plate of the bottom wall is inserted into the insertion slot of the socket housing.

4. The connector assembly according to claim 1, wherein:

the bottom wall of the shielding cover comprises an insertion plate and two support plates;

the two support plates are located on two sides of the insertion plate and extend beyond a distal end of the insertion plate.

5. The connector assembly according to claim 1, wherein:

a front edge and a lower edge of the stop block are integrally connected to a body of the side wall; and the upper stop edge and the rear stop edge are cut out from the body of the side wall and are inwardly separated from the body of the side wall.

6. The connector assembly according to claim 1, further comprising a rear cover, the rear cover comprising an integrally formed pressure application elastic plate, the pressure application elastic plate applying pressure on a rear end of the socket housing.

7. The connector assembly according to claim 1, wherein:

the side wall further comprises a retainer stop behind the stop block; and the retainer stop is engaged with a rear end of the socket housing to prevent the socket connector from moving.

8. The connector assembly according to claim 7, wherein:

a rear edge of the retainer stop is integrally connected to a body of the side wall; and a front edge of the retainer stop abuts the rear end of the socket housing.

9. The connector assembly according to claim 1, wherein:

the shielding cover comprises an upper housing, a lower housing, and a partition frame forming two plug connection channels;

the upper housing comprises the top wall and the two side walls integrally connected to each other;

the lower housing comprises the bottom wall; and the two plug connection channels are defined by the top wall, the two side walls, and the bottom wall and are separated by the partition frame.

10. A connector assembly, comprising:

a shielding cover defining a plug connection channel, a wall of the shielding cover comprising a stop block protruding towards the plug connection channel, and a second opposing wall of the shielding cover comprising a second stop block protruding towards the plug connection channel; and a socket connector comprising a socket housing, the socket housing comprising a stop block accommodation recess on a surface of the socket housing and a second stop block accommodation recess on a second surface of the socket housing, an inner edge of the stop block accommodation recess being stopped by the stop block of the shielding cover.

11. The connector assembly according to claim 10, wherein:

the socket housing further comprises an insertion slot formed in a bottom portion;

the shielding cover further comprises a bottom wall, the bottom wall comprising an insertion plate; and the insertion plate of the bottom wall is inserted into the insertion slot of the socket housing.

12. The connector assembly according to claim 11, wherein:

the bottom wall of the shielding cover comprises two support plates;

the two support plates are located on two sides of the insertion plate and extend beyond a distal end of the insertion plate.

13. The connector assembly according to claim 10, further comprising a rear cover, the rear cover comprising a pressure application elastic plate, the pressure application elastic plate applying pressure on a rear end of the socket housing.

14. The connector assembly according to claim 10, wherein:

the wall further comprises a retainer stop behind the stop block; and the retainer stop is engaged with a rear end of the socket housing to prevent the socket connector from moving.

15. The connector assembly according to claim 10, wherein the shielding cover comprises an upper housing, a lower housing, and a partition frame separating two plug connection channels from each other.

16. A connector assembly, comprising:

a shielding cover defining a plug connection channel, a side wall of the shielding cover comprising a stop block protruding towards the plug connection channel, and a bottom wall of the shielding cover comprising an insertion plate; and a socket connector comprising a socket housing, the socket housing comprising a stop block accommodation recess on a side surface of the socket housing and an insertion slot formed in a bottom portion, an inner edge of the stop block accommodation recess being stopped by the stop block of the shielding cover, and the insertion plate of the bottom wall being inserted into the insertion slot of the socket housing.

17. The connector assembly according to claim 16, wherein:

a second side wall of the shielding cover comprises a second stop block protruding towards the plug connection channel; and the socket housing comprises a second stop block accommodation recess on a second side surface of the socket housing.

18. The connector assembly according to claim 16, wherein:

the bottom wall of the shielding cover further comprises two support plates;

the two support plates are located on two sides of the insertion plate and extend beyond a distal end of the insertion plate.

19. The connector assembly according to claim 16, wherein:

the side wall further comprises a retainer stop behind the stop block; and the retainer stop is engaged with a rear end of the socket housing to prevent the socket connector from moving.

20. The connector assembly according to claim 15, wherein the partition frame comprises:

an upper plate and a lower plate, the upper plate and the lower plate spaced apart from and opposite to each other;

two side connection plates connected between the upper plate and the lower plate and spaced apart from and opposite to each other; and a front connection plate connected between the upper plate and the lower plate and located at a front end of the plug connection channel.

* * * * *